US012763877B2

(12) United States Patent
Bar-Or Tillinger et al.

(10) Patent No.: US 12,763,877 B2
(45) Date of Patent: Oct. 13, 2026

(54) SIGNALING AND REPORTS FOR LOW DENSITY PARITY CHECK GRAPH ADAPTATION

(71) Applicant: QUALCOMM Incorporated, San Diego, CA (US)

(72) Inventors: Amit Bar-Or Tillinger, Tel-Aviv (IL); Shay Landis, Hod Hasharon (IL); Idan Michael Horn, Hod Hasharon (IL)

(73) Assignee: QUALCOMM Incorproated, San Diego, CA (US)

( * ) Notice: Subject to any disclaimer, the term of this patent is extended or adjusted under 35 U.S.C. 154(b) by 776 days.

(21) Appl. No.: 17/934,103

(22) Filed: Sep. 21, 2022

(65) Prior Publication Data

US 2024/0097819 A1 Mar. 21, 2024

(51) Int. Cl.
*H04L 1/00* (2006.01)

(52) U.S. Cl.
CPC .................................. *H04L 1/0057* (2013.01)

(58) Field of Classification Search
CPC ....... H04L 1/0057; H04L 1/18; H04L 1/0041; H03M 13/6306; H03M 13/353; H03M 13/116
See application file for complete search history.

(56) References Cited

U.S. PATENT DOCUMENTS

| | | | | |
|---|---|---|---|---|
| 11,265,012 | B1 * | 3/2022 | Comar | H03M 13/616 |
| 11,664,821 | B1 * | 5/2023 | Asadi | H03M 13/1142 714/776 |
| RE49,989 | E * | 5/2024 | Richardson | H04L 1/0047 |
| 12,068,811 | B2 * | 8/2024 | Yang | H04L 1/0017 |
| 12,261,693 | B2 * | 3/2025 | Patel | H04L 1/0009 |
| 12,464,041 | B2 * | 11/2025 | Sachs | H04W 12/04 |
| 2005/0286438 | A1 * | 12/2005 | Rajkotia | H04L 47/20 455/452.2 |
| 2017/0359148 | A1 * | 12/2017 | Richardson | H03M 13/6393 |
| 2018/0226988 | A1 * | 8/2018 | Soriaga | H03M 13/616 |
| 2018/0226989 | A1 * | 8/2018 | Soriaga | H03M 13/6516 |
| 2018/0234114 | A1 * | 8/2018 | Soriaga | H04L 1/0058 |
| 2018/0323801 | A1 * | 11/2018 | Hsu | H03M 13/116 |
| 2018/0367245 | A1 * | 12/2018 | Soriaga | H04L 1/0069 |
| 2019/0013900 | A1 * | 1/2019 | Patel | H04L 1/1819 |

(Continued)

FOREIGN PATENT DOCUMENTS

| | | | |
|---|---|---|---|
| EP | 3522379 | A1 | 8/2019 |
| EP | 3609101 | A1 | 2/2020 |

(Continued)

OTHER PUBLICATIONS

International Search Report and Written Opinion—PCT/US2023/073879—ISA/EPO—Dec. 7, 2023.

*Primary Examiner* — Sujoy K Kundu
*Assistant Examiner* — Vladislav Y Agureyev
(74) *Attorney, Agent, or Firm* — Patterson + Sheridan, L.L.P.

(57) ABSTRACT

Certain aspects of the present disclosure provide techniques for wireless communications by a user equipment (UE). In one example embodiment, a method for wireless communication includes receiving, from a network entity, an indication of a first Low Density Parity Check (LDPC) graph to be applied for data transmissions to or from the network entity; and processing data transmissions to or from the network entity in accordance with the first LDPC graph.

19 Claims, 14 Drawing Sheets

(56) References Cited

U.S. PATENT DOCUMENTS

2019/0037437 A1 1/2019 Sun et al.
2019/0149986 A1* 5/2019 Luo ........................ H04W 72/23 455/410
2019/0229841 A1* 7/2019 Sandberg .......... H03M 13/6516
2019/0363825 A1* 11/2019 Radosevic .......... H03M 13/616
2020/0028523 A1 1/2020 Li et al.
2020/0053767 A1* 2/2020 Bai ........................ H04W 72/23
2020/0059317 A1* 2/2020 Patel ..................... H04L 1/1819
2020/0119749 A1* 4/2020 Soriaga ................ H03M 13/116
2020/0145024 A1* 5/2020 Wang .................... H04L 1/0007
2020/0153458 A1* 5/2020 Strobel ............. H03M 13/2906
2020/0192754 A1* 6/2020 Cho .................. H03M 13/1575
2020/0266957 A1* 8/2020 Gulati ................... H04L 1/0063
2020/0413420 A1 12/2020 Nam et al.
2021/0345259 A1* 11/2021 Yeo ....................... H04L 5/0064
2022/0029737 A1* 1/2022 Park ...................... H04L 1/0025
2022/0140946 A1* 5/2022 Chen ..................... H04L 1/1819 370/328
2022/0231786 A1* 7/2022 Ye ......................... H04L 1/0041
2022/0272662 A1* 8/2022 Kim .................... H04W 72/044
2022/0361015 A1* 11/2022 Sun ....................... H04W 24/08
2022/0377585 A1* 11/2022 Chen ..................... H04W 72/23
2022/0408445 A1* 12/2022 Sun ...................... H04B 7/0486
2023/0013165 A1* 1/2023 Goldhamer ........... H04L 1/0041
2023/0075114 A1* 3/2023 Ivanov .................. G06F 9/5022
2023/0275687 A1* 8/2023 Li ......................... H04L 1/0013 370/328
2023/0336275 A1* 10/2023 Alloulah ............... H04L 1/0076
2023/0350647 A1* 11/2023 Hasebe ..................... G06F 8/34
2023/0353279 A1* 11/2023 Wu ........................ H04B 10/27
2023/0403030 A1* 12/2023 Nayak ................... G06F 3/0631
2024/0338579 A1* 10/2024 Mori ........................ G06N 5/04
2024/0362382 A1* 10/2024 Mori ........................ A01H 1/02
2024/0380420 A1* 11/2024 Ye ..................... H03M 13/6362
2024/0406948 A1* 12/2024 Tang ..................... H04W 4/027

FOREIGN PATENT DOCUMENTS

EP 3667926 A1 * 6/2020 ........... H04L 1/1819
WO WO-2017091244 A1 * 6/2017 ........ H03M 13/3769
WO 2019099469 A1 5/2019
WO WO-2025034777 A1 * 2/2025 ........ H03M 13/6516

* cited by examiner

600

$$H = \begin{bmatrix} 1 & 1 & 1 & 0 & 0 \\ 1 & 0 & 0 & 1 & 1 \\ 1 & 1 & 0 & 0 & 1 \\ 0 & 1 & 1 & 1 & 0 \end{bmatrix} \qquad x = \begin{bmatrix} x_1 \\ x_2 \\ x_3 \\ x_4 \\ x_5 \end{bmatrix}$$

FIG. 6

SIGNALING AND REPORTS FOR LOW DENSITY PARITY CHECK GRAPH ADAPTATION

BACKGROUND

Field of the Disclosure

Aspects of the present disclosure relate to wireless communications, and more particularly, to techniques for signaling and reporting low density parity check (LDPC) graphs.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE). The method includes receiving, from a network entity, an indication of a first Low Density Parity Check (LDPC) graph to be applied for data transmissions to or from the network entity; and processing data transmissions to or from the network entity in accordance with the first LDPC graph.

Another aspect provides a method for wireless communications by a network entity. The method includes transmitting an indication of a first LDPC graph to be applied for data transmissions to or from a UE; and processing data transmissions to or from the UE in accordance with the first LDPC graph.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 6 depicts a matrix representation of the example LDPC code of FIG. 5, in accordance with certain aspects of the present disclosure.

DETAILED DESCRIPTION

Aspects of the present disclosure provide apparatuses, methods, processing systems, and computer-readable mediums for signaling and reporting low density parity check (LDPC) graphs.

In certain wireless systems, such as 5G new radio (NR), various physical-layer channel coding schemes using polar and low-density parity-check (LDPC) codes have been introduced for various types of communications, to achieve improved throughput, latency, and reliability. In many systems, LDPC coding is used for user data, while polar coding is used for control information.

A parity check matrix of LDPC codes can be represented by a bipartite graph (as described below with reference to FIGS. 5-8). Low density in a parity check matrix generally refers to a sparse graph representation, which may result in low decoding complexity and efficient decoding.

Unfortunately, LDPC decoders are one of the main power consuming modules in current (e.g., 5G-NR) baseband receivers. This is expected to become more prominent with the growth in bandwidth, utilizing bands in frequency ranges (FRs) like FR4 (52.6 GHz-114.25 GHz) and FR5 (114.25 GHz-300 GHz), as data rates are expected to increase dramatically. Conventional wireless systems utilize an LDPC encoder scheme where LDPC graphs are selected primarily based on code block size. As a result, LDPC graphs may be selected that are less than optimal for power consumption or other considerations, such as channel conditions or code rate.

Aspects of the present disclosure, however, allow for LDPC graph adaptation, in which LDPC graphs may be selected based on various criteria. In some cases, a UE may signal a network entity (e.g., a base station) an indicated of a preferred LDPC graph. The network may then reply with an indication of an LDPC to be applied to subsequent data transmissions. As a result, different LDPC graphs may be selected that are optimal for different scenarios. The different graphs may provide more or less power consumption, may converge better than other graphs, and one graph may be more resilient to a dispersive channel than another. The ability to adapt LDPC graphs based on various criteria may result in reduced power, better performance, and better overall user experience.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
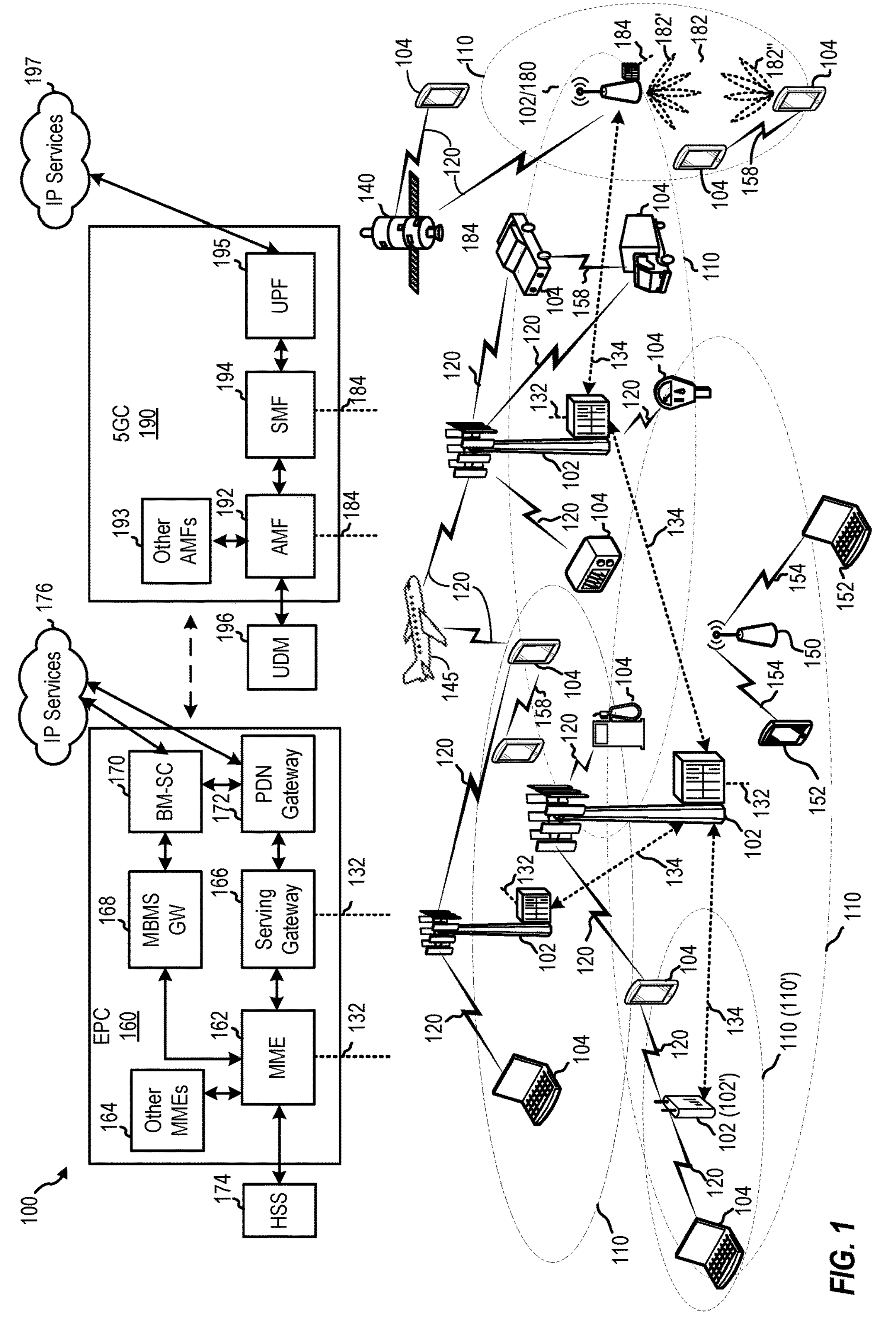
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
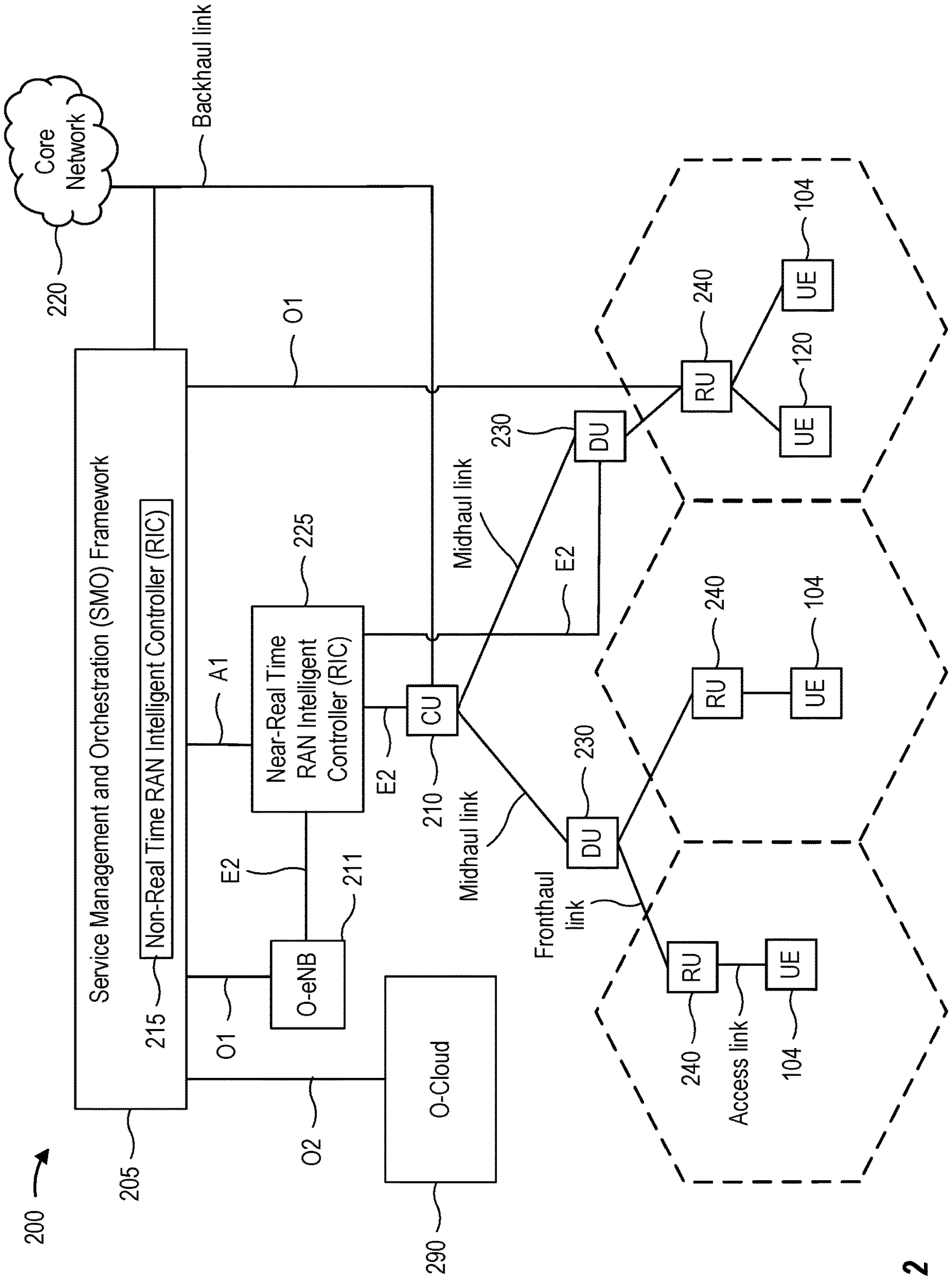
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
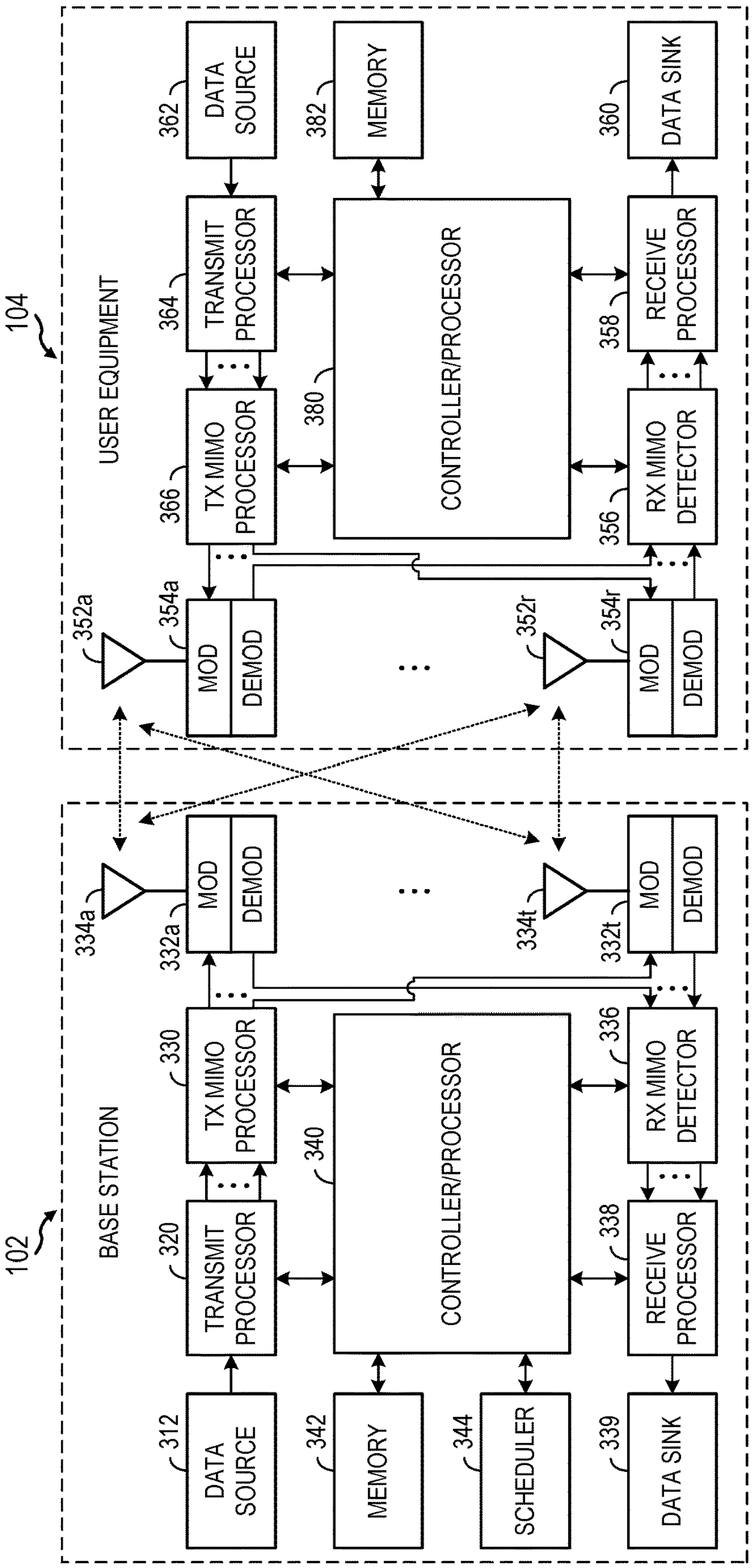
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4B:
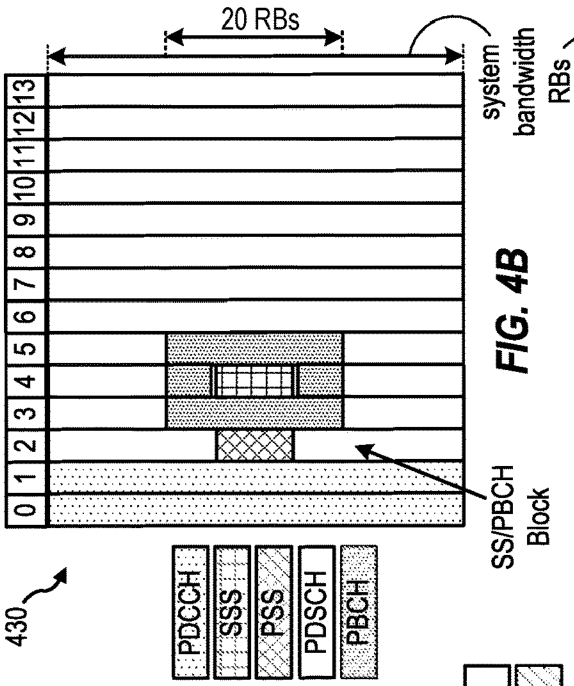
FIGS. 4A, 4B, 4C, and 4D depict various example aspects of data structures for a wireless communications network.
Figure 4A:
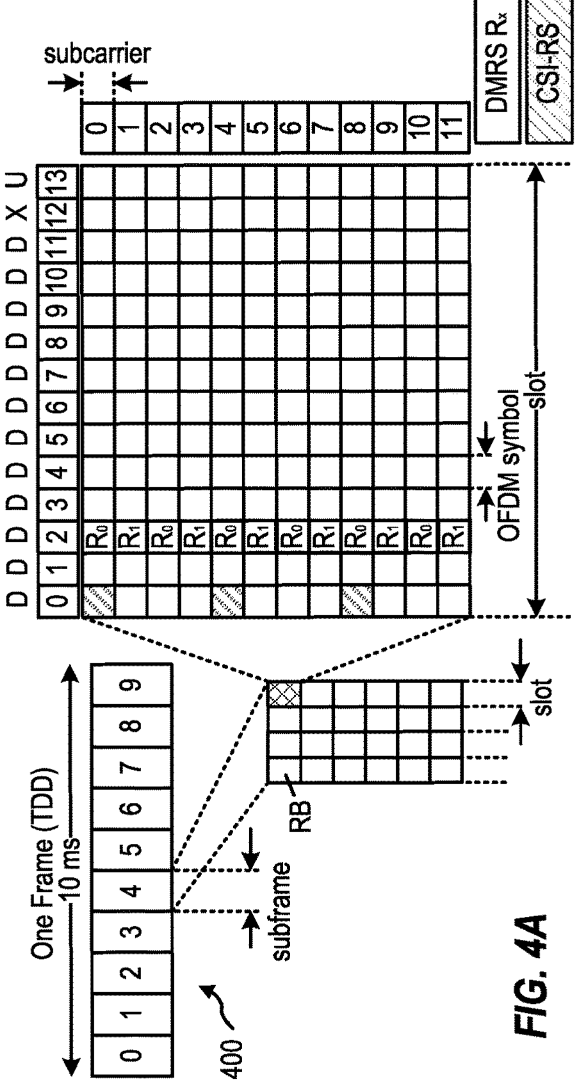
Figure 4D:
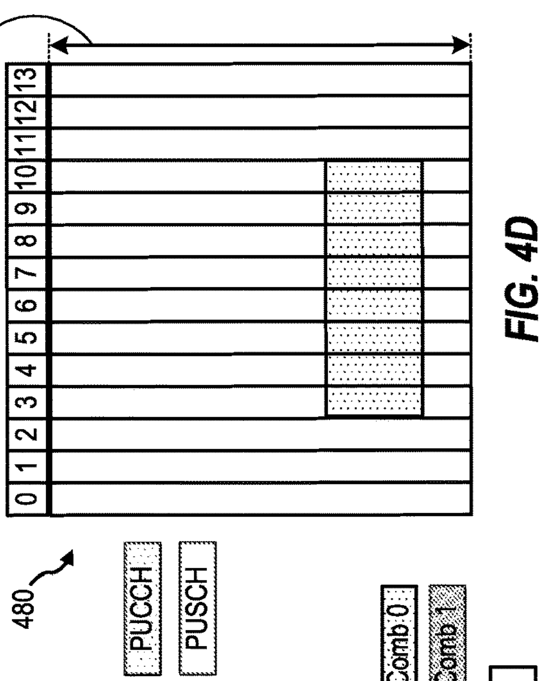
Figure 4C:
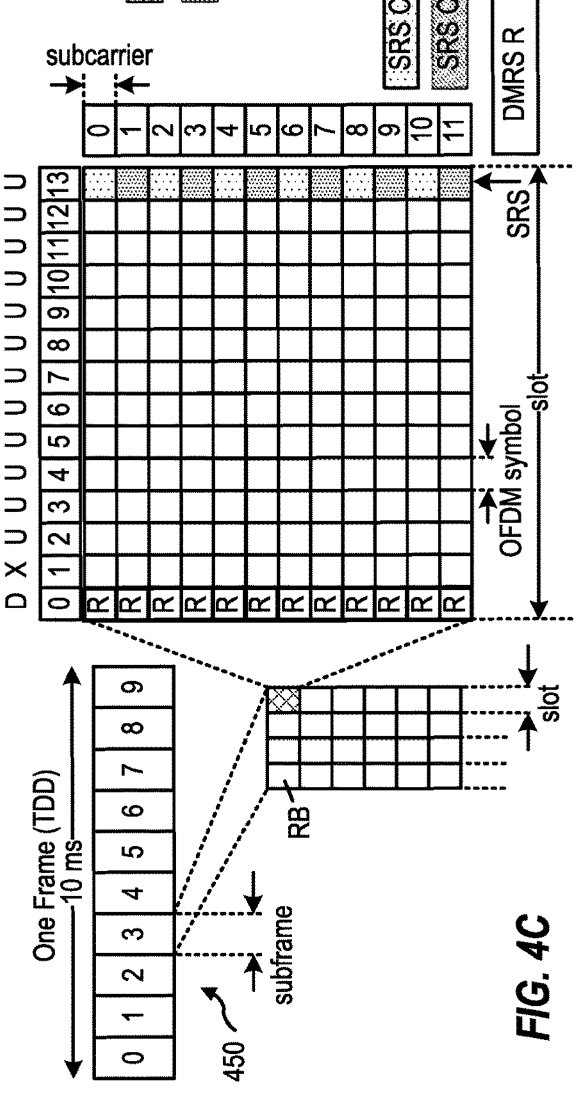

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times15$ kHz, where μ, is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Low Density Parity Codes

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

LDPC codes can be represented by bipartite graphs (often referred to as "Tanner graphs"). In a bipartite graph, a set of variable nodes corresponds to bits of a code word (e.g., information bits or systematic bits), and a set of check nodes correspond to a set of parity-check constraints that define the code. Edges in the graph connect variable nodes to check nodes. Thus, the nodes of the graph are separated into two distinctive sets and with edges connecting nodes of two different types, variable and check.

Graphs as used in LDPC coding may be characterized in a variety of manners. A lifted code is created by copying a bipartite base graph (G) (or a protograph), a number of times, Z. The number of times is referred to herein as the lifting, lifting size, or lifting size value. A variable node and a check node are considered "neighbors" if they are connected by an "edge" (i.e., the line connecting the variable node and the check node) in the graph. In addition, for each edge (e) of the bipartite base graph (G), a permutation (generally an integer value associated with the edge permutation that is represented by k and referred to as the lifting value) is applied to the Z copies of edge (e) to interconnect the Z copies of G. A bit sequence having a one-to-one association with the variable node sequence is a valid code word if and only if, for each check node, the bits associated with all neighboring variable nodes sum to 0 modulo 2 (i.e., they include an even number of 1's). The resulting LDPC code may be quasi-cyclic (QC) if the permutations (liftings values) used are cyclic.

Figure 5:
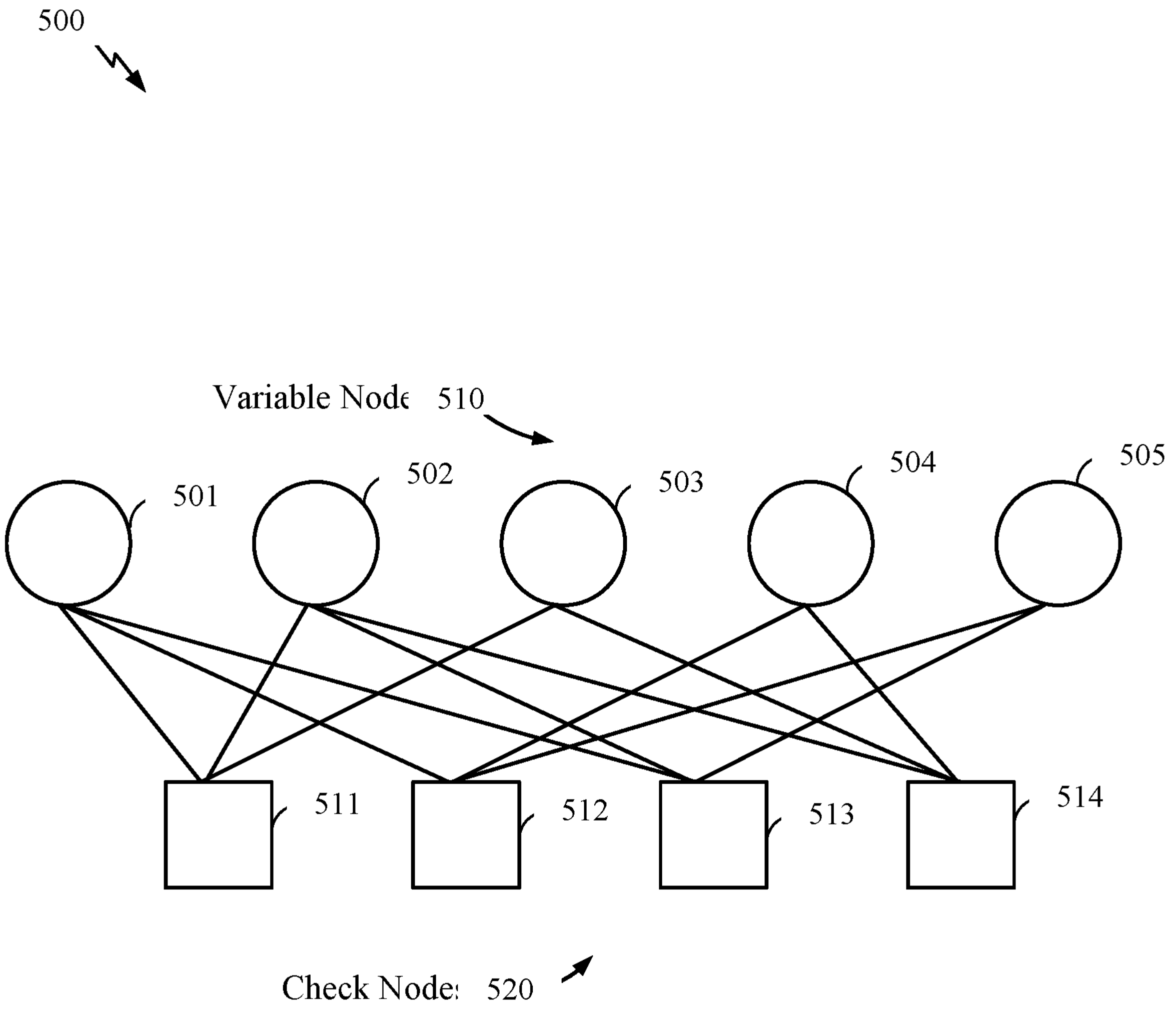
FIG. 5 depicts a graphical representation of an example low-density parity-check (LDPC) code, in accordance with certain aspects of the present disclosure.

FIGS. 5 and 6 show graphical and matrix representations, respectively, of an example LDPC code, in accordance with certain aspects of the present disclosure. For example, FIG. 5 shows a bipartite graph 500 representing an example LDPC code. Bipartite graph 500 includes a set of five variable nodes 510 (represented by circles) connected to four check nodes 520 (represented by squares). Edges in bipartite graph 500 connect variable nodes 510 to check nodes 520 (the edges are represented by the lines connecting variable nodes 510 to check nodes 520). Bipartite graph 500 consists of |V|=5 variable nodes and |C|=4 check nodes, connected by |E|=12 edges.

Bipartite graph 500 may be represented by a simplified adjacency matrix, which may also be known as a parity check matrix (PCM). FIG. 6 shows a matrix representation 600 of bipartite graph 500. Matrix representation 600 includes a PCM H and a code word vector x, where $x_1$-$x_5$ represent bits of the code word x. H is used for determining whether a received signal was normally decoded. H has C rows corresponding to j check nodes and V columns corresponding to i variable nodes (i.e., a demodulated symbol), where the rows represent the equations and the columns represents the bits of the code word. In FIG. 6, matrix H has four rows and five columns corresponding to four check nodes and five variable nodes, respectively. If a j-th check node is connected to an i-th variable node by an edge (i.e., the two nodes are neighbors), then there is a 1 in the i-th column and in the j-th row of the parity check matrix H. That is, the intersection of an i-th row and a j-th column contains a "1" where an edge joins the corresponding vertices and a "0" where there is no edge. The code word vector x represents a valid code word if and only if $H_x=0$, for example, if for each constraint node, the bits neighboring the constraint, via their association with variable nodes, sum to 0 modulo 2 (i.e., they comprise an even number of 1'a). Thus, if the code word is received correctly, then $H_x=0$ (mod 2). When the product of a coded received signal and the PCM H becomes '0', this signifies that no error has occurred.

The number of demodulated symbols or variable nodes is the LDPC code length. The number of non-zero elements in a row (column) is defined as the row (column) weight d(c)d(v). The degree of a node refers to the number of edges connected to that node. For example, as shown in FIG. 5, the variable node 501 has three degrees of connectivity, with edges connected to check nodes 511, 512, and 513. Variable node 502 has three degrees of connectivity, with edges connected to check nodes 511, 513, and 514. Variable node 503 has two degrees of connectivity, with edges connected to check nodes 511 and 514. Variable node 504 has two degrees of connectivity, with edges connected to check nodes 512 and 514. And variable node 505 has two degrees of connectivity, with edges connected to check nodes 512 and 513. This feature is illustrated in the matrix H shown in FIG. 6 where the number of edges incident to a variable node 510 is equal to the number of 1's in the corresponding column and is called the variable node degree d(v). Similarly, the number of edges connected with a check node 520 is equal to the number of ones in a corresponding row and is called the check node degree d(c). For example, as shown in FIG. 6, the first column in the matrix H corresponds to the variable node 501 and the corresponding entries in the column (1, 1, 1, 0) indicates the edge connections to the check nodes 511, 512, and 513, while the 0 indicates that there is not an edge to check node 514. The entries in the second, third, fourth, and fifth columns of H represent the edge connections of the variable nodes 502, 503, 504, and 505, respectively, to the check nodes.

A regular graph or a regular code is one for which all variable nodes have the same degree and all constraint nodes have the same degree. On the other hand, an irregular code has constraint nodes and/or variable nodes of differing degrees. For example, some variable nodes may be of degree 4, others of degree 3, and still others of degree 2.

"Lifting" enables LDPC codes to be implemented using parallel encoding and/or decoding implementations while also reducing the complexity typically associated with large LDPC codes. Lifting helps enable efficient parallelization of LDPC decoders while still having a relatively compact description. More specifically, lifting is a technique for generating a relatively large LDPC code from multiple copies of a smaller base code. For example, a lifted LDPC code may be generated by producing Z of parallel copies of the base graph (e.g., protograph) and then interconnecting the parallel copies through permutations of edge bundles of each copy of the base graph. The base graph defines the (macro) structure of the code and consists of a number (K) of information bit columns and a number (N) of code bit columns. Lifting the base graph a number of liftings Z results in a final block length of KZ. Thus, a larger graph can be obtained by a "copy and permute" operation where multiple copies of the base graph are made and connected to form a single lifted graph. For the multiple copies, like edges are a set of copies of single base edge, are permutated and connected to form a connected graph Z times larger than the base graph.

Figure 7:
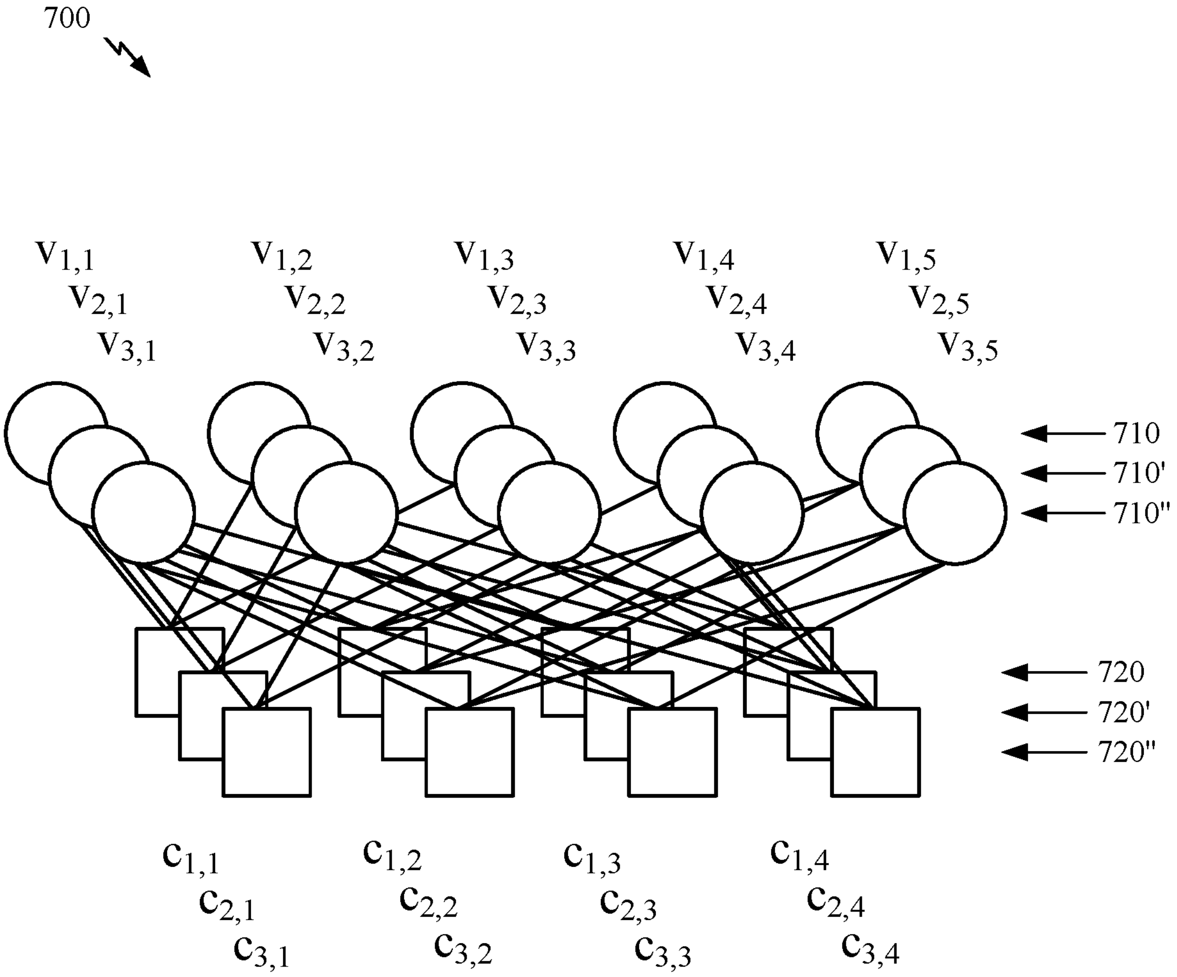
FIG. 7 depicts a graphical representation of liftings of the LDPC code of FIG. 5, in accordance with certain aspects of the present disclosure.

FIG. 7 is a bipartite graph illustrating liftings of three copies of the bipartite graph 500 of FIG. 5. Three copies may be interconnected by permuting like edges among the copies. If the permutations are restricted to cyclic permutations, then the resulting bipartite graph 700 corresponds to a quasi-cyclic LDPC with lifting Z=3. The original graph 500 from which three copies were made is referred to herein as the base graph. To obtain graphs of different sizes, "copy and permute" operation can be applied to the base graph.

A corresponding PCM of the lifted graph can be constructed from the parity check matrix of the base graph by replacing each entry in the base parity check matrix with a Z×Z matrix. The "0" entries (those having no base edges) are replaced with the 0 matrix and the 1 entries (indicating a base edge) are replaced with a Z×Z permutation matrix. In the case of cyclic liftings, the permutations are cyclic permutations.

A cyclically lifted LDPC code can also be interpreted as a code over the ring of binary polynomials modulo $x^z+1$. In this interpretation, a binary polynomial, $(x)=b_0+b_1x+b_2x^2+\ldots+b_{z-1}x^{z-1}$ may be associated to each variable node in the base graph. The binary vector $(b_0, b_1, b_2, \ldots, b_{z-1})$ corresponds to the bits associated to Z corresponding variable nodes in the lifted graph, that is, Z copies of a single base variable node. A cyclic permutation by k (referred to as a lifting value associated to the edges in the graph) of the binary vector is achieved by multiplying the corresponding binary polynomial by $x^k$ where multiplication is taken modulo $x^z+1$. A degree d parity check in the base graph can be interpreted as a linear constraint on the neighboring binary polynomials $B_1(x), \ldots, B_d(x)$, written as $x^{k_1}B_1(x)+x^{k_2}B_2(x)+\ldots+x^{k_d}B_d(x)=0x^{k_1}B_1(x)+x^{k_2}B_2(x)+\ldots+x^{k_d}B_d(x)=0$, the values, $k_1, \ldots, k_d$ are the cyclic lifting values associated to the corresponding edges.

This resulting equation is equivalent to the Z parity checks in the cyclically lifted Tanner graph corresponding to the single associated parity check in the base graph. Thus, the parity check matrix for the lifted graph can be expressed using the matrix for the base graph in which 1 entries are replaced with monomials of the form $x^k$ and 0 entries are lifted as 0, but now the 0 is interpreted as the 0 binary polynomial modulo $x^z+1$. Such a matrix may be written by giving the value k in place of $x^k$. In this case the 0 polynomial is sometimes represented as "−1" and sometimes as another character in order to distinguish it from $x^0$.

Figure 8:
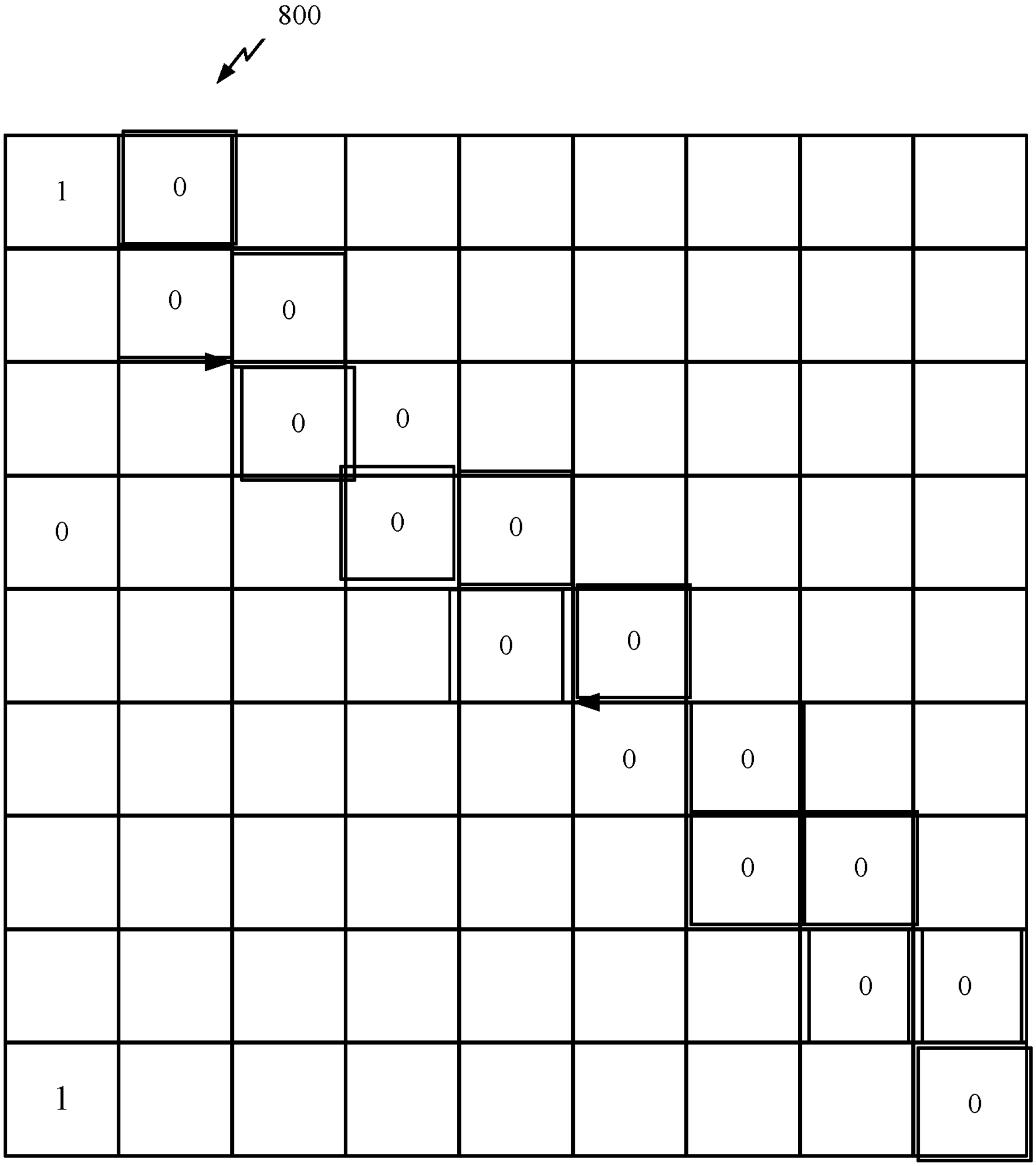
FIG. 8 depicts an integer representation of a matrix for a quasi-cyclic LDPC code according to some aspects.

Typically, a square submatrix of the parity check matrix represents the parity bits of the code. The complementary columns correspond to information bits that, at the time of encoding, are set equal to the information bits to be encoded. The encoding may be achieved by solving for the variables in the aforementioned square submatrix in order to satisfy the parity check equations. The parity check matrix H may be partitioned into two parts M and N where M is the square portion. Thus, encoding reduces to solving $M_c=s=Nd$ where c and d comprise x. In the case of quasi-cyclic codes, or cyclically lifted codes, the above algebra can be interpreted as being over the ring of binary polynomials modulo $x^z+1$. In the case of the 802.11 LDPC codes, which are quasi-cyclic, the encoding submatrix M has an integer representation as shown in FIG. 8.

A received LDPC code word can be decoded to produce a reconstructed version of the original code word. In the absence of errors, or in the case of correctable errors, decoding can be used to recover the original data unit that was encoded. Redundant bits may be used by decoders to detect and correct bit errors. LDPC decoder(s) generally operate by iteratively performing local calculations and passing those results by exchanging messages within the bipartite graph along the edges, and updating these messages by performing computations at the nodes based on the incoming messages. These steps may be repeated several times. For example, each variable node 510 in the graph 500 may initially be provided with a "soft bit" (e.g., representing the received bit of the code word) that indicates an estimate of the associated bit's value as determined by observations from the communications channel. Using these soft bits the LDPC decoders may update messages by iteratively reading them, or some portion thereof, from memory and writing an updated message, or some portion thereof, back to, memory. The update operations are typically based on the parity check constraints of the corresponding LDPC code. In implementations for lifted LDPC codes, messages on like edges are often processed in parallel.

LDPC codes designed for high speed applications often use quasi-cyclic constructions with large lifting factors and relatively small base graphs to support high parallelism in encoding and decoding operations. LDPC codes with higher code rates (e.g., the ratio of the message length to the codeword length) tend to have relatively fewer parity checks. If the number of base parity checks is smaller than the degree of a variable node (e.g., the number of edges connected to a variable node), then, in the base graph, that variable node is connected to at least one of the base parity checks by two or more edges (e.g., the variable node may have a "double edge"). If the number of base parity checks is smaller than the degree of a variable node (e.g., the number of edges connected to a variable node), then, in the base graph, that variable node is connected to at least one of the base parity checks by two or more edges. Having a base variable node and a base check node connected by two or more edges is generally undesirable for parallel hardware implementation purposes. For example, such double edges may result in multiple concurrent read and write operations to the same memory locations, which in turn may create data coherency problems. A double edge in a base MIT code may trigger parallel reading of the same soft bit value memory location twice during a single parallel parity check update. Thus, additional circuitry is typically needed to combine the soft bit values that are written back to memory, so as to properly incorporate both updates. Eliminating double edges in the LDPC code helps to avoid this extra complexity.

LDPC code designs based on cyclic lifting can be interpreted, as codes over the ring of polynomials modulo may be binary polynomials modulo $x^{z-1}$, where Z is the lifting size (e.g., the size of the cycle in the quasi-cyclic code). Thus encoding such codes can often be interpreted as an algebraic operation in this ring.

In the definition of standard irregular LDPC code ensembles (degree distributions) all edges in the Tanner graph representation may be statistically interchangeable. In other words, there exists a single statistical equivalence class of edges. A more detailed discussion of lifted LDPC codes may be found, for example, in the book titled, "Modern Coding Theory," published Mar. 17, 2008, by Tom Richardson and Ruediger Urbanke. For multi-edge LDPC codes, multiple equivalence classes of edges may be possible. While in the standard irregular LDPC ensemble definition, nodes in the graph (both variable and constraint) are specified by their degree, i.e., the number of edges they are connected to, in the multi-edge type setting an edge degree is a vector; it specifies the number of edges connected to the node from each edge equivalence class (type) independently. A multi-edge type ensemble is comprised of a finite number of edge types. The degree type of a constraint node is a vector of (non-negative) integers; the i-th entry of this vector records the number of sockets of the i-th type connected to such a node. This vector may be referred to as an edge degree. The degree type of a variable node has two parts although it can be viewed as a vector of (non-negative) integers. The first part relates to the received distribution and will be termed the received degree and the second part specifies the edge degree. The edge degree plays the same role as for constraint nodes. Edges are typed as they pair sockets of the same type. The constraint that sockets must pair with sockets of like type characterizes the multi-edge type concept. In a multi-edge type description, different node types can have different received distributions (e.g., the associated bits may go through different channels).

Puncturing is the act of removing bits from a codeword to yield a shorter codeword. Thus, punctured variable nodes correspond to codeword bits that are not actually transmitted. Puncturing a variable node in an LDPC code creates a shortened code (e.g. due to the removal of a bit), while also effectively removing a check node. Specifically, for a matrix representation of an LDPC code, including bits to be punctured, where the variable node to be punctured has a degree of one (such a representation may be possible through row combining provided the code is proper), puncturing the variable node removes the associated bit from the code and effectively removes its single neighboring check node from the graph. As a result, the number of check nodes in the graph is reduced by one.

In current wireless systems (e.g., 5G NR), there are two types of base graphs to select from. As explained above, a base graph generally refers to a matrix with entries that can be further expanded based on an expansion factor Zc. Constructing the LDCP parity check matrix for a given information block size K and code rate R=K/N, may be as follows. One of the base graphs (BG1 or BG2) may be selected for a given combination of K and R. After base graph selection, a base matrix expansion factor Zc may be determined (e.g., by selecting a minimum Zc value in a table, such that Kb×Zc≥K). After Zc is determined, a corresponding shift coefficient matrix set can be selected from a table. Etries values in the base matrix can be determined based on the Zc, with a shifting coefficient value P(i,j) calculated by a modular Z operation:

$$P(i,j)=f(Vi,j,z)=\mathrm{mod}(Vi,j,z).$$

where values could be looked up from tables. Finally, each entry in the final exponent matrix can be replaced with the corresponding circulant permutation matrix or zero matrix. The LDPC code construction is completed and a parity check matrix H is obtained.

Aspects Related to Signaling and Reports for Low Density Parity Check Graph Adaptation One challenge in current wireless systems (e.g., 5G-NR) is to reduce power consumption of the UE. Unfortunately, LDPC decoders are one of the main power consuming modules in UE baseband receivers.

Figure 9:
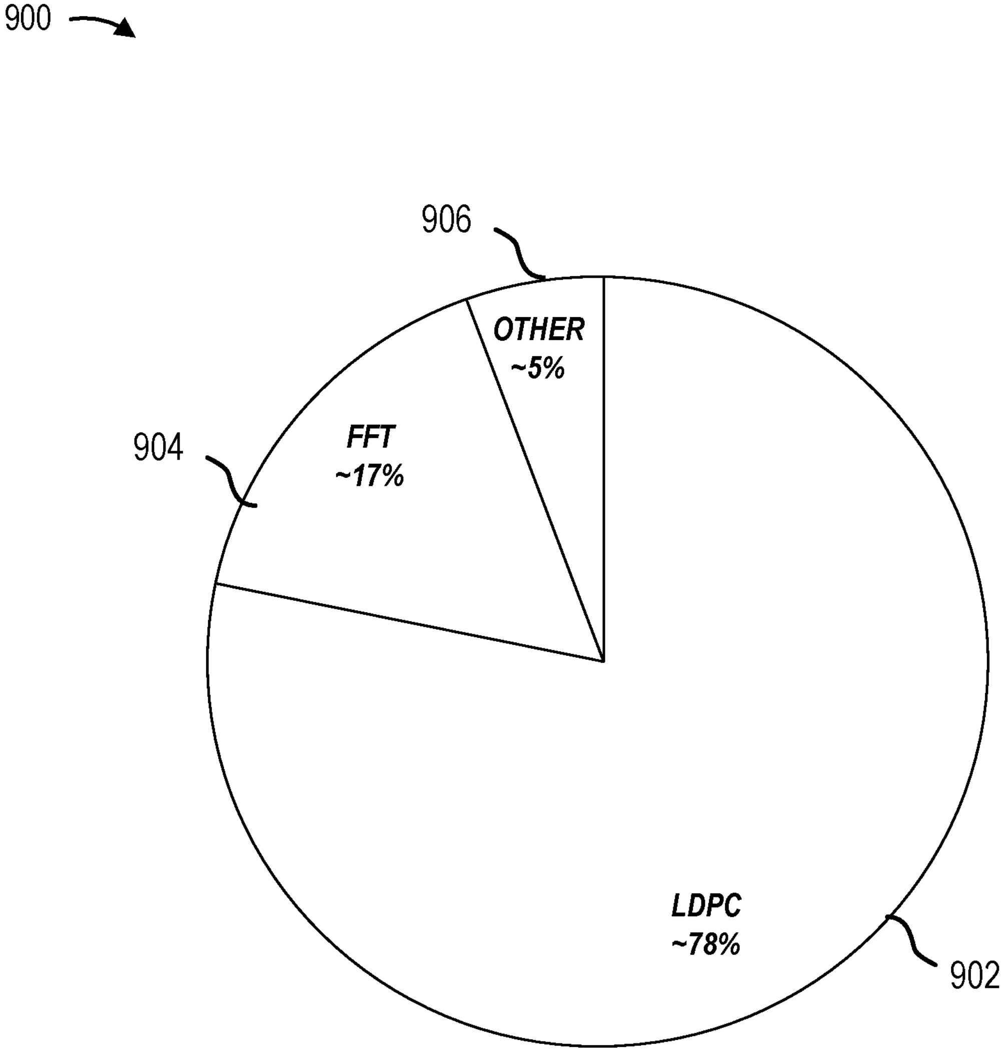
FIG. 9 depicts an example LDPC graph of a power breakdown analysis.

For example, FIG. 9 depicts a chart 900 of a power breakdown analysis for a common Sub-THz scenario, using a 5G LDPC graph. As can be seen at 902, in this example the LDPC decoder is the highest power consuming baseband module accounting for approximately 78% of baseband module poser consumption. The other modules consume much less power, with the closest being the FFT module accounting for approximately at 17% (as seen at 904), with all other modules accounting for approximately 5% (as seen at 906). Accordingly, any power reduction of the LDPC module will have a significant impact of the overall power consumption of the modem.

As noted above, LDPC decoder related power consumption is expected to become more prominent with the growth in bandwidth, utilizing bands in FR4 and FR5, as data rates are expected to increase dramatically. Conventional wireless systems select LDPC graphs primarily based on code block size, which may result in the selection of LDPC graphs that are less than optimal for power consumption or other considerations, such as channel conditions or code rate.

Aspects of the present disclosure, however, allow for LDPC graph adaptation, in which LDPC graphs may be selected based on various criteria. The techniques described herein may allow the use of LDPC graphs that are optimized for different criteria.

Some such criteria relates to power consumption, which is related to the number of ‘1s’ of the parity check matrix, as well as the efficiency to perform a parallel decoding. Other such criteria relate to performance for flat or dispersive channels and convergence of the decoder, which generally refers to how many iterations of a decoder would be required to reach a certain level of reliability. Still other criteria relate to performance for different coding rates, for example, using the same graph for multiple coding rates (as well as for retransmissions with different redundancy versions) by puncturing of the encoder output.

Aspects of the present disclosure enable an LDPC decoder that can be implemented in an architecture which allows support of multiple graphs, for example, by manipulating the multiplexing of the signals according to the positions of ‘1’ in the parity check matrix. Supporting this flexibility may enable LDPC graphs to be adapted for a low power mode, which may significantly reduce the overall power consumption.

Figure 10:
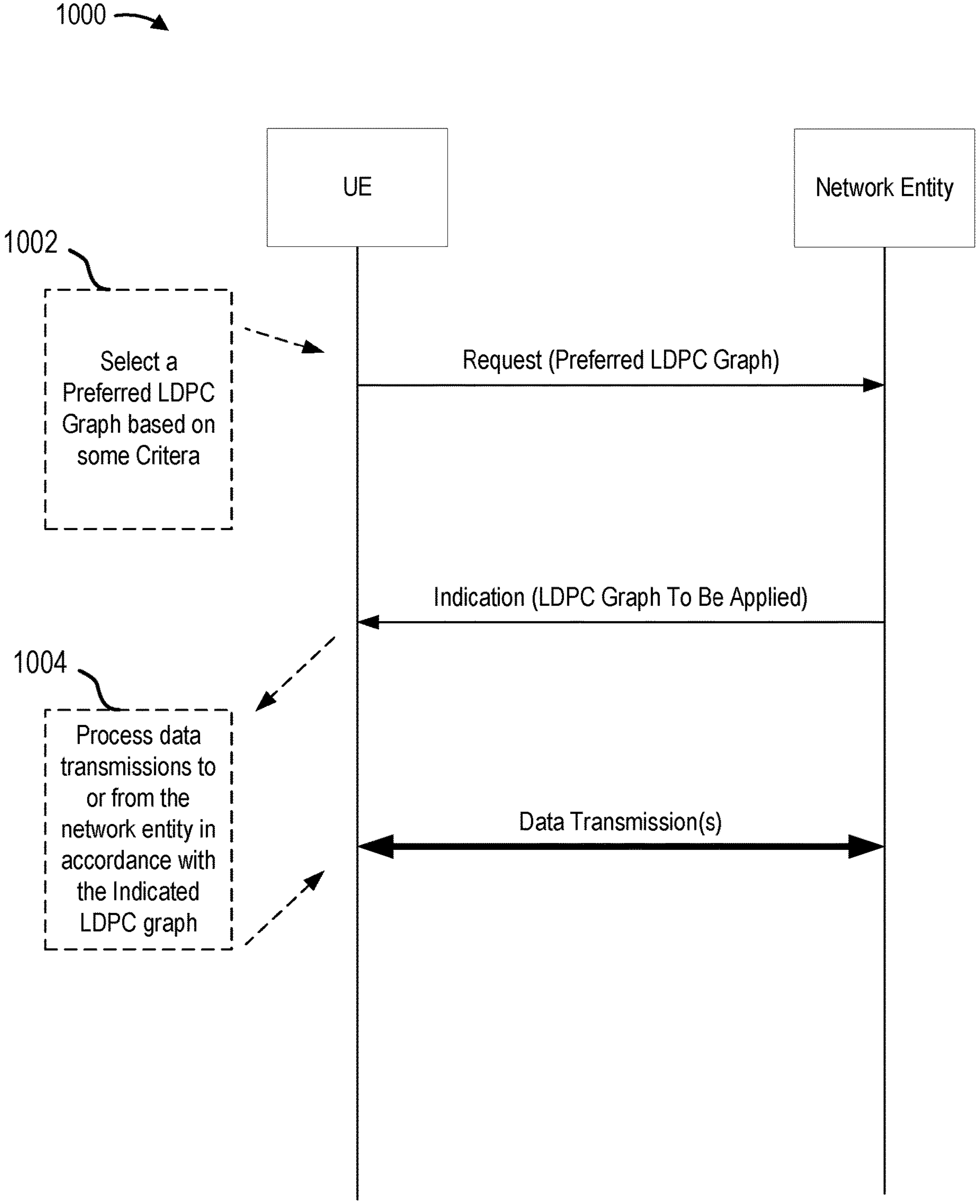
FIG. 10 depicts an example call flow diagram for selecting and reporting LDPC graphs, in accordance with aspects of the present disclosure.

LDPC graph adaptation proposed herein may be understood with reference to the call flow diagram 1000 of FIG. 10, which shows example signaling between a UE and network entity. The UE may be an example of one of the UEs 104 illustrated in FIG. 1 or FIG. 3. The network entity may be an example of a base station 102 illustrated in FIG. 1 or FIG. 3 or a node of a disaggregated base station, as illustrated in FIG. 2.

As illustrated at 1002, in some cases, the UE may select a preferred LDPC graph, from a plurality of LDPC graphs (the UE is configured with or configured to support), based on some criteria. The UE may then send a request for the preferred LDPC graph to the network entity.

In response to the request, the network entity may transmit an indication of an LDPC graph to be applied. The UE (and network entity) may then process (uplink and/or downlink) data transmissions in accordance with the indicated LDPC graph, as shown at 1004.

The request could be sent as an uplink control request, for example, via uplink control information (UCI), MAC-CE, or RRC signaling. The response could be sent as downlink control, for example, via downlink control information (DCI), MAC-CE, or RRC signaling. The LDPC graphs indicated in the requests and/or indications may be applied statically or semi-statically (e.g., may continue to be applied until some time has passed or conditions is met).

The LDPC graph indicated by the network entity may be the same as the preferred LDPC graph indicated in the request (e.g., the request may be granted). As an alternative, the indicated LDPC graph could be different than the preferred LDPC indicated in the request. For example, the network entity may decide a different LDPC graph is more suitable, based on criteria applied at its end. Further, in some cases, the network entity may indicate an LDPC graph, without receiving a request (or the network entity could send its own request).

Figure 11:
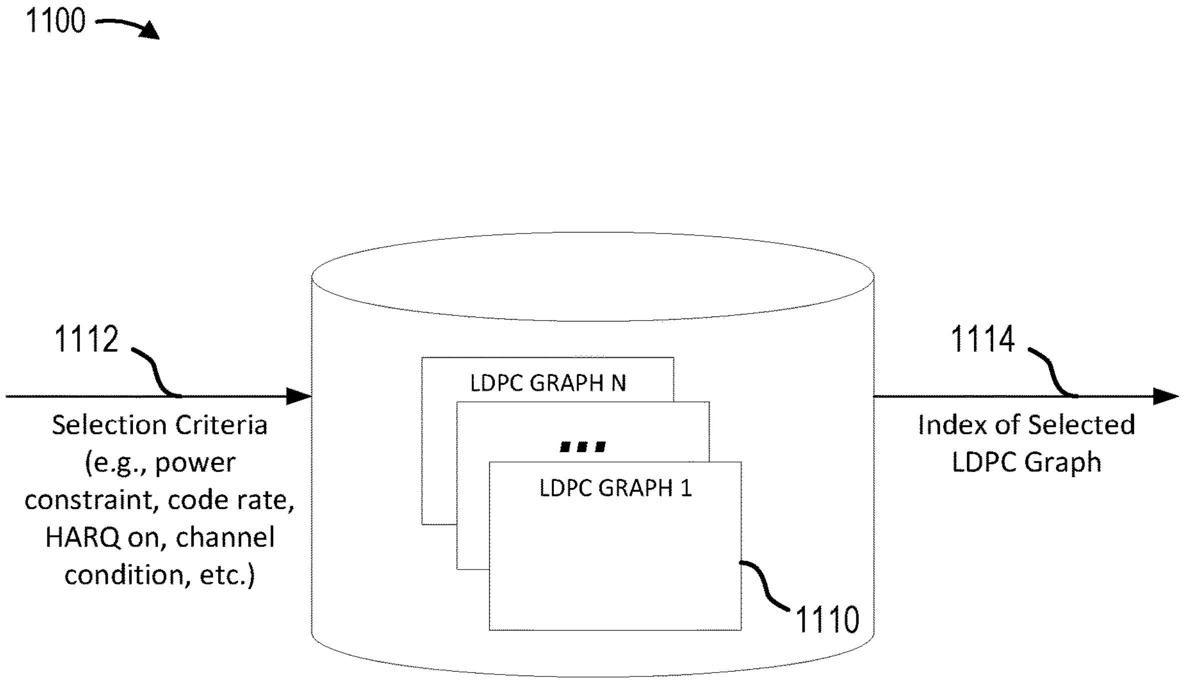
FIG. 11 depicts an example of LDPC graph selection, in accordance with aspects of the present disclosure.

Diagram 1100 of FIG. 11 depicts an example of how an LDPC graph 1110 could be selected based on criteria. Based on the criteria, an LDPC graph may be selected (and identified by an index, which may be signaled in the request or indication).

As illustrated, the criteria may relate to a power constraint of the UE, a code rate, or a channel condition related parameter. In some cases, for a certain power constraint and code rate combination, there may be one LDPC graph to select, while another LDPC graph may be selected for a different power constraint and code rate combination. Thus, power constraints and code rates may not necessarily be independent selection criteria. In general, LDPC graphs may be selected based on multiple parameters or criteria.

The criteria may also relate to whether a hybrid automatic repeat request (HARQ) mechanism is used or not. For example, if a HARQ mechanism is not used, then a graph suitable for multiple retransmissions may not be needed (and each transmission may a send different section of the code).

In general, aspects of the present disclosure allow for different LDPC graphs to be selected that are optimal for different scenarios. The different graphs may provide more or less power consumption, may converge better than other graphs, and one graph may be more resilient to a dispersive channel than another. The ability to adapt LDPC graphs based on various criteria may result in reduced power, better performance, and better overall user experience.

Example Operations of a User Equipment

Figure 12:
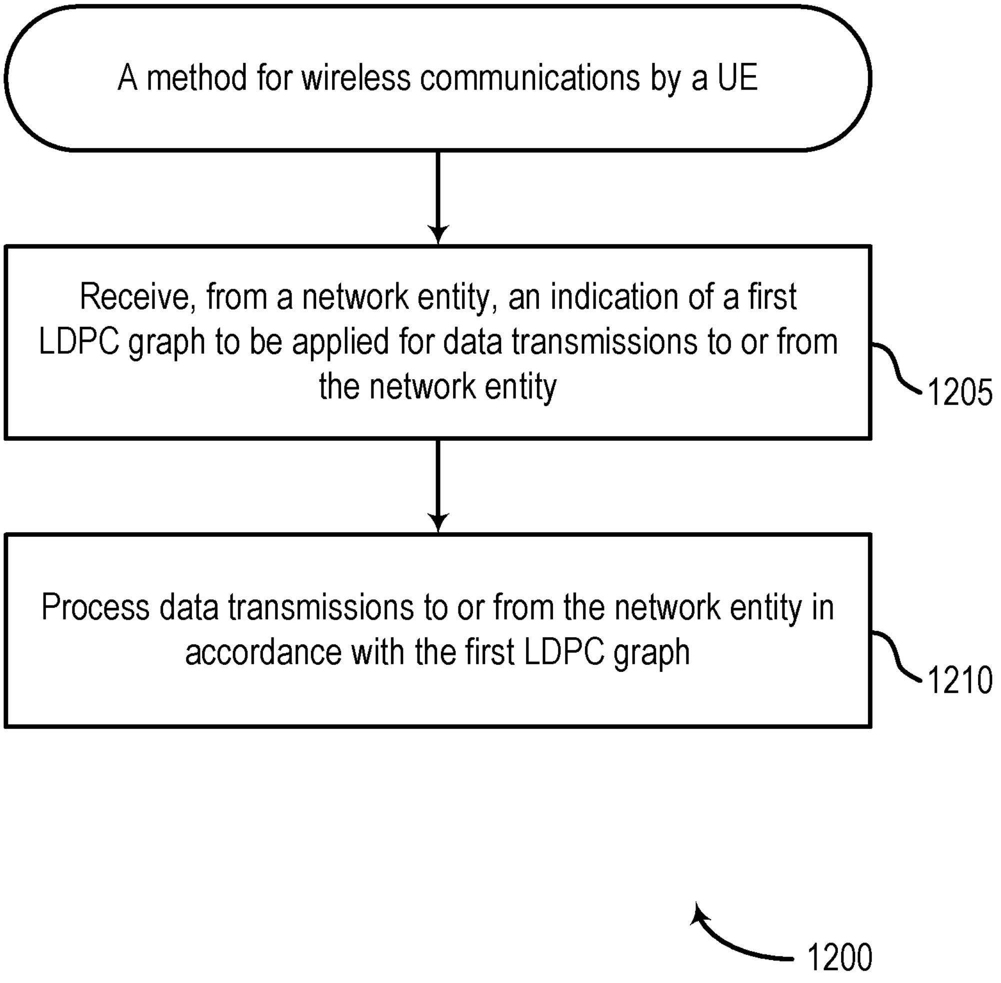
FIG. 12 depicts a method for wireless communications.

FIG. 12 shows an example of a method 1200 for wireless communications by a UE, such as a UE 104 of FIGS. 1 and 3.

Method 1200 begins at step 1205 with receiving, from a network entity, an indication of a first LDPC graph to be applied for data transmissions to or from the network entity. In some cases, the operations of this step refer to, or may be performed by, circuitry for receiving and/or code for receiving as described with reference to FIG. 14.

Method 1200 then proceeds to step 1210 with processing data transmissions to or from the network entity in accordance with the first LDPC graph. In some cases, the operations of this step refer to, or may be performed by, circuitry for processing and/or code for processing as described with reference to FIG. 14.

In some aspects, the indication is received via at least one of DCI, MAC-CE, or RRC signaling.

In some aspects, the indicated LDPC graph is applied statically or semi-statically.

In some aspects, the method 1200 further includes selecting an LDPC graph, from a plurality of LDPC graphs, based on one or more criteria. In some cases, the operations of this step refer to, or may be performed by, circuitry for selecting and/or code for selecting as described with reference to FIG. 14.

In some aspects, the method 1200 further includes sending a request, to the network entity, to apply the selected LDPC graph, wherein the indication of the first LDPC graph is received in response the request. In some cases, the operations of this step refer to, or may be performed by, circuitry for sending and/or code for sending as described with reference to FIG. 14.

In some aspects, the first LDPC graph comprises the LDPC graph selected by the UE or a different LDPC graph selected by the network entity.

In some aspects, the request is transmitted via at least one of UCI, MAC-CE, or RRC signaling.

In some aspects, the criteria is based on at least one of: a power constraint of the UE; a code rate; whether a HARQ mechanism is used; or a channel condition related parameter.

In some aspects, the request is for the selected LDPC graph to be applied statically or semi-statically.

In some aspects, the plurality of LDPC graphs comprise more than two LDPC graphs.

Figure 14:
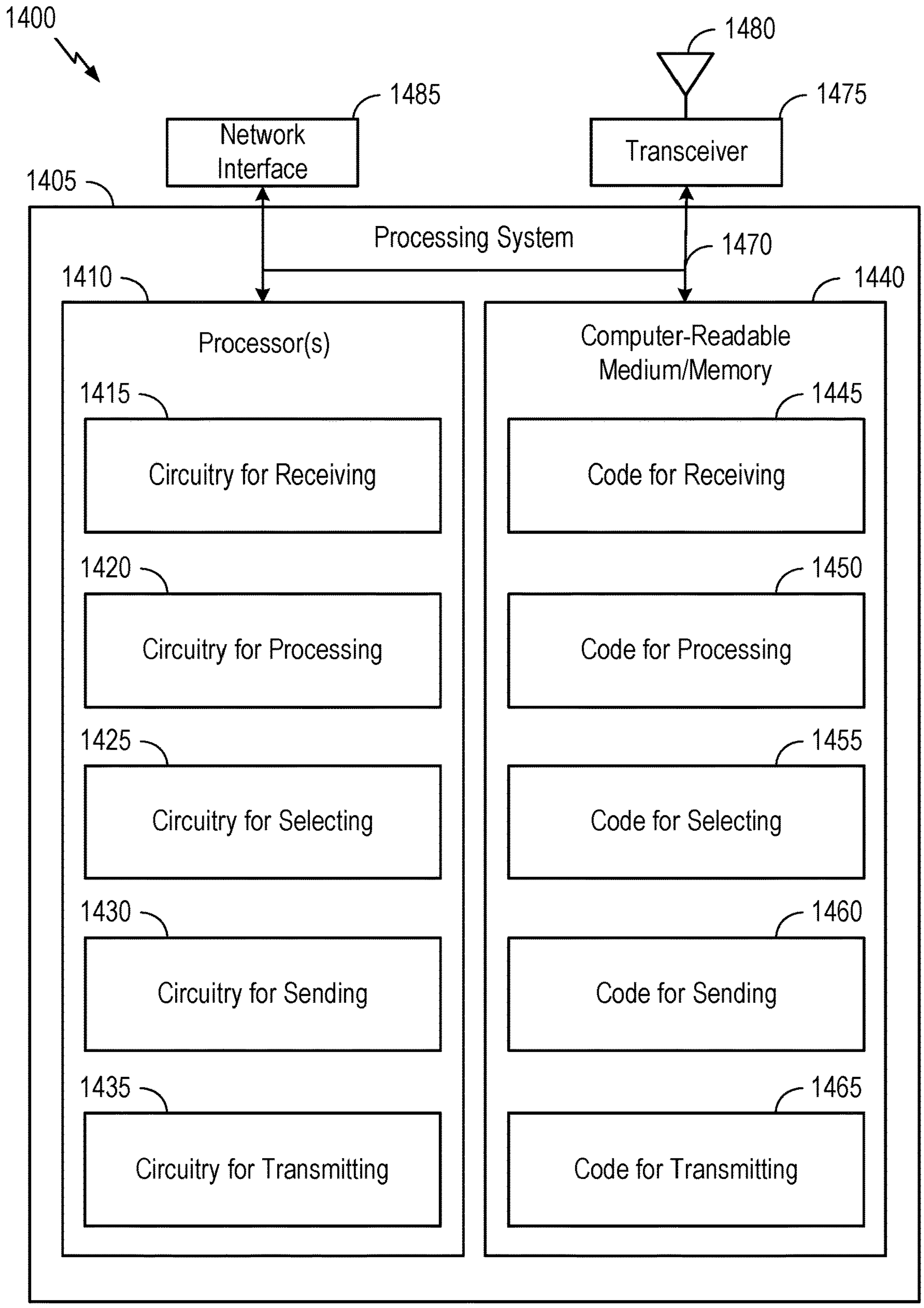
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Operations of a Network Entity

Figure 13:
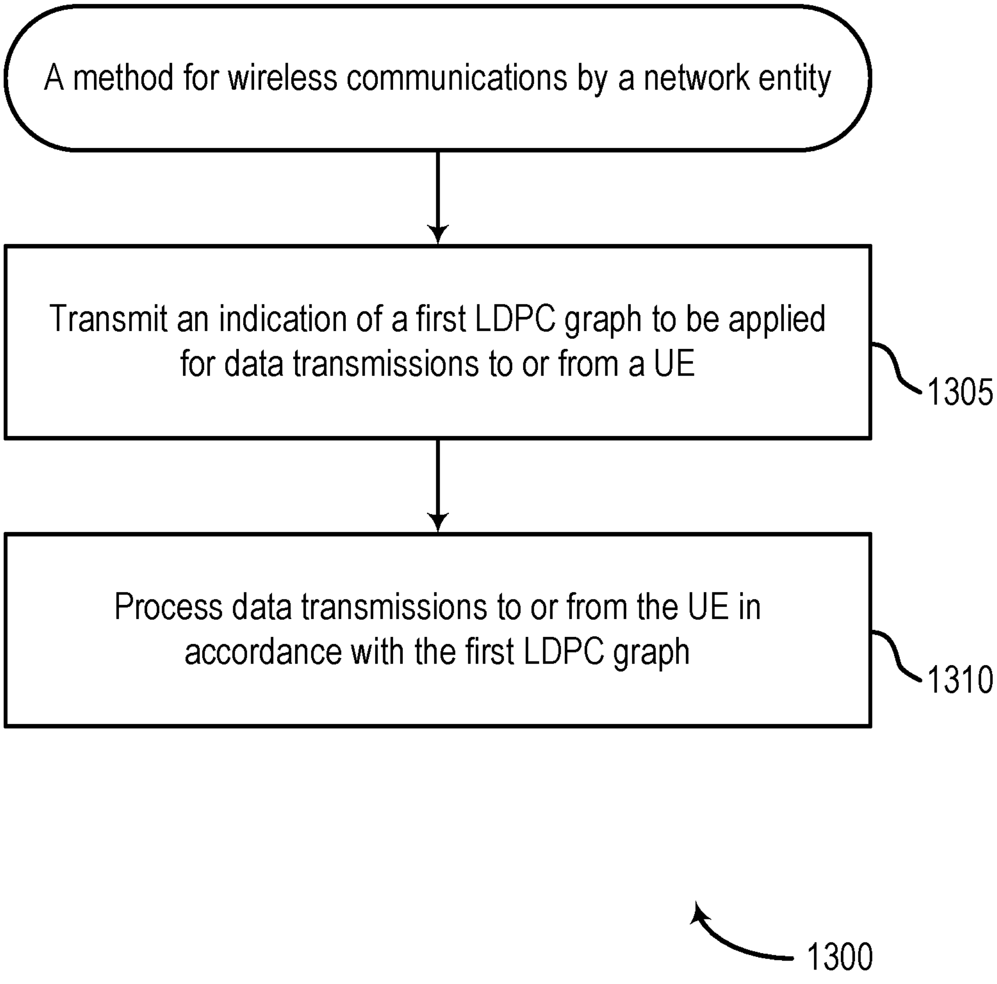
FIG. 13 depicts a method for wireless communications.

FIG. 13 shows an example of a method 1300 for wireless communications by a network entity, such as a BS 102 of FIGS. 1 and 3, or a disaggregated base station as discussed with respect to FIG. 2.

Method 1300 begins at step 1305 with transmitting an indication of a first LDPC graph to be applied for data transmissions to or from a UE. In some cases, the operations of this step refer to, or may be performed by, circuitry for transmitting and/or code for transmitting as described with reference to FIG. 14.

Method 1300 then proceeds to step 1310 with processing data transmissions to or from the UE in accordance with the first LDPC graph. In some cases, the operations of this step refer to, or may be performed by, circuitry for processing and/or code for processing as described with reference to FIG. 14.

In some aspects, the indication is transmitted via at least one of DCI, MAC-CE, or RRC signaling.

In some aspects, the indicated LDPC graph is applied statically or semi-statically.

In some aspects, the method 1300 further includes selecting the first LDPC graph, from a plurality of LDPC graphs, based on one or more criteria. In some cases, the operations of this step refer to, or may be performed by, circuitry for selecting and/or code for selecting as described with reference to FIG. 14.

In some aspects, the plurality of LDPC graphs comprise more than two LDPC graphs.

In some aspects, the criteria is based on at least one of: a power constraint of the UE; a code rate; whether a HARQ mechanism is used; a channel condition related parameter; or a request for an LDPC graph from the UE.

In some aspects, the method 1300 further includes receiving the request, wherein the indication of the first LDPC graph is transmitted in response the request. In some cases, the operations of this step refer to, or may be performed by, circuitry for receiving and/or code for receiving as described with reference to FIG. 14.

In some aspects, the first LDPC graph comprises the LDPC graph selected by the UE or a different LDPC graph selected by the network entity based on the criteria.

In some aspects, the request is received via at least one of UCI, MAC-CE, or RRC signaling.

In some aspects, the request is for the selected LDPC graph to be applied statically or semi-statically.

In one aspect, method 1300, or any aspect related to it, may be performed by an apparatus, such as communications device 1400 of FIG. 14, which includes various components operable, configured, or adapted to perform the method 1300. Communications device 1400 is described below in further detail.

Note that FIG. 13 is just one example of a method, and other methods including fewer, additional, or alternative steps are possible consistent with this disclosure.

Example Communications Device

FIG. 14 depicts aspects of an example communications device 1400. In some aspects, communications device 1400 is a user equipment, such as UE 104 described above with respect to FIGS. 1 and 3. In some aspects, communications device 1400 is a network entity, such as BS 102 of FIGS. 1 and 3, or a disaggregated base station as discussed with respect to FIG. 2.

The communications device 1400 includes a processing system 1405 coupled to the transceiver 1475 (e.g., a transmitter and/or a receiver). In some aspects (e.g., when communications device 1400 is a network entity), processing system 1405 may be coupled to a network interface 1485 that is configured to obtain and send signals for the communications device 1400 via communication link(s), such as a backhaul link, midhaul link, and/or fronthaul link as described herein, such as with respect to FIG. 2. The transceiver 1475 is configured to transmit and receive signals for the communications device 1400 via the antenna 1480, such as the various signals as described herein. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of receive processor 358, transmit processor 364, TX MIMO processor 366, and/or controller/processor 380, as described with respect to FIG. 3. In various aspects, one or more processors 1410 may be representative of one or more of receive processor 338, transmit processor 320, TX MIMO processor 330, and/or controller/processor 340, as described with respect to FIG. 3. The one or more processors 1410 are coupled to a computer-readable medium/memory 1440 via a bus 1470. In certain aspects, the computer-readable medium/memory 1440 is configured to store instructions (e.g., computer-executable code) that when executed by the one or more processors 1410, cause the one or more processors 1410 to perform: the method 1200 described with respect to FIG. 12, or any aspect related to it; and/or the method 1300 described with respect to FIG. 13, or any aspect related to it. Note that reference to a processor performing a function of communications device 1400 may include one or more processors 1410 performing that function of communications device 1400.

In the depicted example, computer-readable medium/memory 1440 stores code (e.g., executable instructions), such as code for receiving 1445, code for processing 1450, code for selecting 1455, code for sending 1460, and code for transmitting 1465. Processing of the code for receiving 1445, code for processing 1450, code for selecting 1455, code for sending 1460, and code for transmitting 1465 may cause the communications device 1400 to perform: the method 1200 described with respect to FIG. 12, or any aspect related to it; and/or the method 1300 described with respect to FIG. 13, or any aspect related to it.

The one or more processors 1410 include circuitry configured to implement (e.g., execute) the code stored in the computer-readable medium/memory 1440, including circuitry such as circuitry for receiving 1415, circuitry for processing 1420, circuitry for selecting 1425, circuitry for sending 1430, and circuitry for transmitting 1435. Processing with circuitry for receiving 1415, circuitry for processing 1420, circuitry for selecting 1425, circuitry for sending 1430, and circuitry for transmitting 1435 may cause the communications device 1400 to perform: the method 1200 described with respect to FIG. 12, or any aspect related to it; and/or the method 1300 described with respect to FIG. 13, or any aspect related to it.

Various components of the communications device 1400 may provide means for performing: the method 1200 described with respect to FIG. 12, or any aspect related to it; and/or the method 1300 described with respect to FIG. 13, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1475 and the antenna 1480 of the communications device 1400 in FIG. 14. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1475 and the antenna 1480 of the communications device 1400 in FIG. 14.

Example Clauses

Implementation examples are described in the following numbered clauses:

Clause 1: A method for wireless communications by a UE, comprising: receiving, from a network entity, an indication of a first LDPC graph to be applied for data transmissions to or from the network entity; and processing data transmissions to or from the network entity in accordance with the first LDPC graph.

Clause 2: The method of Clause 1, wherein the indication is received via at least one of DCI, MAC-CE, or RRC signaling.

Clause 3: The method of any one of Clauses 1 and 2, wherein the indicated LDPC graph is applied statically or semi-statically.

Clause 4: The method of any one of Clauses 1-3, further comprising: selecting an LDPC graph, from a plurality of LDPC graphs, based on one or more criteria and sending a request, to the network entity, to apply the selected LDPC graph, wherein the indication of the first LDPC graph is received in response the request.

Clause 5: The method of Clause 4, wherein the first LDPC graph comprises the LDPC graph selected by the UE or a different LDPC graph selected by the network entity.

Clause 6: The method of Clause 4, wherein the request is transmitted via at least one of UCI, MAC-CE, or RRC signaling.

Clause 7: The method of Clause 4, wherein the criteria is based on at least one of: a power constraint of the UE; a code rate; whether a HARQ mechanism is used; or a channel condition related parameter.

Clause 8: The method of Clause 4, wherein the request is for the selected LDPC graph to be applied statically or semi-statically.

Clause 9: The method of Clause 4, wherein the plurality of LDPC graphs comprise more than two LDPC graphs.

Clause 10: A method for wireless communications by a network entity, comprising: transmitting an indication of a first LDPC graph to be applied for data transmissions to or from a UE; and processing data transmissions to or from the UE in accordance with the first LDPC graph.

Clause 11: The method of Clause 10, wherein the indication is transmitted via at least one of DCI, MAC-CE, or RRC signaling.

Clause 12: The method of any one of Clauses 10 and 11, wherein the indicated LDPC graph is applied statically or semi-statically.

Clause 13: The method of any one of Clauses 10-12, further comprising: selecting the first LDPC graph, from a plurality of LDPC graphs, based on one or more criteria.

Clause 14: The method of Clause 13, wherein the plurality of LDPC graphs comprise more than two LDPC graphs.

Clause 15: The method of Clause 13, wherein the criteria is based on at least one of: a power constraint of the UE; a code rate; whether a HARQ mechanism is used; a channel condition related parameter; or a request for an LDPC graph from the UE.

Clause 16: The method of Clause 14, further comprising: receiving the request, wherein the indication of the first LDPC graph is transmitted in response the request.

Clause 17: The method of Clause 16, wherein the first LDPC graph comprises the LDPC graph selected by the UE or a different LDPC graph selected by the network entity based on the criteria.

Clause 18: The method of Clause 16, wherein the request is received via at least one of UCI, MAC-CE, or RRC signaling.

Clause 19: The method of Clause 16, wherein the request is for the selected LDPC graph to be applied statically or semi-statically.

Clause 20: An apparatus, comprising: a memory comprising executable instructions; and a processor configured to execute the executable instructions and cause the apparatus to perform a method in accordance with any one of Clauses 1-19.

Clause 21: An apparatus, comprising means for performing a method in accordance with any one of Clauses 1-19.

Clause 22: A non-transitory computer-readable medium comprising executable instructions that, when executed by a processor of an apparatus, cause the apparatus to perform a method in accordance with any one of Clauses 1-19.

Clause 23: A computer program product embodied on a computer-readable storage medium comprising code for performing a method in accordance with any one of Clauses 1-19.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), the method comprising:

selecting a first Low Density Parity Check (LDPC) graph, from a plurality of LDPC graphs, based on one or more criteria;

sending a request, to a network entity, to apply the first LDPC graph;

receiving, from the network entity in response to the request, an indication of an LDPC graph to be applied for data transmissions to or from the network entity; and processing data transmissions to or from the network entity in accordance with the LDPC graph.

2. The method of claim 1, wherein the indication is received via at least one of downlink control information (DCI), medium access control (MAC) control element (CE), or radio resource control (RRC) signaling.

3. The method of claim 1, wherein the indicated LDPC graph is applied statically or semi-statically.

4. The method of claim 1, wherein the LDPC graph comprises the first LDPC graph selected by the UE or a second LDPC graph selected by the network entity.

5. The method of claim 1, wherein the request is transmitted via at least one of uplink control information (UCI), medium access control (MAC) control element (CE), or radio resource control (RRC) signaling.

6. The method of claim 1, wherein the one or more criteria is based on at least one of:

a power constraint of the UE;

a code rate;

whether a hybrid automatic repeat request (HARQ) mechanism is used; or a channel condition related parameter.

7. The method of claim 1, wherein the request is for the selected first LDPC graph to be applied statically or semi-statically.

8. The method of claim 1, wherein the plurality of LDPC graphs comprise more than two LDPC graphs.

9. A method for wireless communications by a network entity, the method comprising:

receiving a request, from a user equipment (UE), to apply a selected Low Density Parity Check (LDPC) graph;

transmitting, in response to the request, an indication of an LDPC graph to be applied for data transmissions to or from the UE; and processing data transmissions to or from the UE in accordance with the LDPC graph.

10. The method of claim 9, wherein the indication is transmitted via at least one of downlink control information (DCI), medium access control (MAC) control element (CE), or radio resource control (RRC) signaling.

11. The method of claim 9, wherein the indicated LDPC graph is applied statically or semi-statically.

12. The method of claim 9, further comprising selecting the LDPC graph, from a plurality of LDPC graphs, based on one or more criteria.

13. The method of claim 12, wherein the plurality of LDPC graphs comprise more than two LDPC graphs.

14. The method of claim 12, wherein the one or more criteria is based on at least one of:

a power constraint of the UE;

a code rate;

whether a hybrid automatic repeat request (HARQ) mechanism is used;

a channel condition related parameter; or the request for the first LDPC graph from the UE.

15. The method of claim 9, wherein the LDPC graph comprises the first LDPC graph selected by the UE or a second LDPC graph selected by the network entity based on one or more criteria.

16. The method of claim 9, wherein the request is received via at least one of uplink control information (UCI), medium access control (MAC) control element (CE), or radio resource control (RRC) signaling.

17. The method of claim 9, wherein the request is for the selected first LDPC graph to be applied statically or semi-statically.

18. A user equipment (UE) configured for wireless communication, the UE comprising:

a memory comprising processor-executable instructions; and one or more processors configured to, individually or collectively, execute the processor-executable instructions and cause the UE to:

select a first Low Density Parity Check (LDPC) graph, from a plurality of LDPC graphs, based on one or more criteria;

send a request, to a network entity, to apply the first LDPC graph;

receive, from the network entity in response to the request, an indication of an LDPC graph to be applied for data transmissions to or from the network entity; and process data transmissions to or from the network entity in accordance with the LDPC graph.

19. A network entity configured for wireless communication, the network entity comprising:

a memory comprising processor-executable instructions; and one or more processors configured to, individually or collectively, execute the processor-executable instructions and cause the network entity to:

receive a request, from a user equipment (UE), to apply a selected Low Density Parity Check (LDPC) graph;

transmit, in response to the request, an indication of an LDPC graph to be applied for data transmissions to or from the UE; and process data transmissions to or from the UE in accordance with the LDPC graph.

* * * * *